United States Patent
Dittmer et al.

(10) Patent No.: US 10,976,433 B2
(45) Date of Patent: Apr. 13, 2021

(54) ULTRASOUND SYSTEM WITH WIDE DEPTH AND DETAILED VIEWING

(71) Applicant: KONINKLIJKE PHILIPS N.V., Eindhoven (NL)

(72) Inventors: Wendy Uyen Dittmer, Eindhoven (NL); Antonia Cornelia (Jeannet) Van Rens, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 413 days.

(21) Appl. No.: 15/757,397

(22) PCT Filed: Sep. 9, 2016

(86) PCT No.: PCT/EP2016/071242
§ 371 (c)(1),
(2) Date: Mar. 5, 2018

(87) PCT Pub. No.: WO2017/042304
PCT Pub. Date: Mar. 16, 2017

(65) Prior Publication Data
US 2018/0246208 A1     Aug. 30, 2018

(30) Foreign Application Priority Data

Sep. 10, 2015   (EP) .................................. 15184586

(51) Int. Cl.
*G01S 15/89* (2006.01)
*G01S 7/52* (2006.01)

(52) U.S. Cl.
CPC ...... *G01S 15/8993* (2013.01); *G01S 7/52063* (2013.01); *G01S 7/52073* (2013.01); *G01S 7/52074* (2013.01); *G01S 15/8952* (2013.01)

(58) Field of Classification Search
CPC ............. G01S 15/8993; G01S 15/8952; G01S 7/52063; G01S 7/52073; G01S 7/52074
See application file for complete search history.

(56) References Cited

U.S. PATENT DOCUMENTS 5,361,767 A    11/1994 Yukov
5,873,830 A    2/1999 Hossack et al.
(Continued)

FOREIGN PATENT DOCUMENTS

JP    2011507561 A    3/2011
JP    2012023910 A    2/2012
(Continued)

OTHER PUBLICATIONS

McLean et al "CMUTS With Dual Electrode Structure for Improved Transmit and Receive Performance" 2004 IEEE Ultrasonics Symposium Aug. 23-27, 2004 Montreal Canada, vol. 1, Aug. 23, 2004 p. 501-504.

*Primary Examiner* — Sanjay Cattungal (57) ABSTRACT

The invention relates to an ultrasound system for imaging a volumetric region comprising a region of interest comprising: a probe having an array of CMUT transducers adapted to steer ultrasound beams in a variable frequency range over the volumetric region; a beamformer coupled to the array and adapted to control the ultrasound beam steering and provide ultrasound image data of the volumetric region; a transducer frequency controller coupled to the beamformer and adapted to vary operation frequencies of the CMUT transducers within the frequency range, which frequency controller is arranged to set the operation frequency to a first frequency for the ultrasound beam steered in the volumetric region; an image processor responsive to the ultrasound image data, based on which it is adapted to produce an ultrasound image. The system further comprises a region of interest (ROI) identifier enabling to identify the region of
(Continued)

interest on the basis of the ultrasound image data, wherein the identifier is adapted to generate identification data indicating the region of interest within the volumetric region; wherein the transducer frequency controller is further adapted to set, based on the identification data, the operation frequency to a second frequency for the ultrasound beams steered within the region of interest, the second frequency being higher than the first frequency.

15 Claims, 7 Drawing Sheets

(56) References Cited

U.S. PATENT DOCUMENTS

| | | | |
|---|---|---|---|
| 6,328,697 B1 | 12/2001 | Fraser | |
| 6,592,520 B1* | 7/2003 | Peszynski | A61B 8/12 600/437 |
| 7,529,393 B2* | 5/2009 | Peszynski | A61B 8/0833 382/128 |
| 9,877,699 B2* | 1/2018 | Chiang | G16H 30/20 |
| 2007/0167821 A1* | 7/2007 | Lee | A61B 8/4488 600/463 |
| 2008/0228081 A1* | 9/2008 | Becker | A61B 8/12 600/459 |
| 2009/0112097 A1 | 4/2009 | Kato et al. | |
| 2010/0152590 A1* | 6/2010 | Moore | A61B 1/00082 600/466 |
| 2010/0249588 A1* | 9/2010 | Knight | A61B 8/12 600/437 |
| 2010/0260398 A1* | 10/2010 | Ma | A61B 6/469 382/131 |
| 2010/0262013 A1* | 10/2010 | Smith | G01S 15/8929 600/459 |
| 2011/0028845 A1* | 2/2011 | Haider | A61B 8/4483 600/459 |
| 2011/0163630 A1 | 7/2011 | Klootwijk et al. | |
| 2001/3006108 | 1/2013 | Yoshiara et al. | |
| 2013/0028536 A1* | 1/2013 | Hazard | A61B 8/5276 382/275 |
| 2015/0141833 A1* | 5/2015 | Dayton | A61B 8/4494 600/458 |
| 2015/0162851 A1 | 6/2015 | Kolltwijk et al. | |

FOREIGN PATENT DOCUMENTS

| | | |
|---|---|---|
| WO | 2009073748 A1 | 6/2009 |
| WO | 2015028314 A1 | 3/2015 |
| WO | 2015086413 A1 | 6/2015 |

* cited by examiner

ULTRASOUND SYSTEM WITH WIDE DEPTH AND DETAILED VIEWING

This application is the U.S. National Phase application under 35 U.S.C. § 371 of International Application No. PCT/EP2016/071242, filed on Sep. 9, 2016, which claims the benefit of EP Application Serial No. 15184586.4, filed Sep. 10, 2015. These applications are hereby incorporated by reference herein.

FIELD OF THE INVENTION

The invention relates to an ultrasound system for imaging a volumetric region comprising a region of interest comprising: a probe suitable for intracavity imaging and having an array of CMUT transducers adapted to steer ultrasound beams in a variable frequency range over the volumetric region; a beamformer coupled to the array and adapted to control the ultrasound beam steering and provide ultrasound image data of the volumetric region; a transducer frequency controller coupled to the beamformer and adapted to vary operation frequencies of the CMUT transducers within the frequency range, which frequency controller is arranged to set the operation frequency to a first frequency for the ultrasound beam steered in the volumetric region; an image processor responsive to the ultrasound image data, based on which it is adapted to produce an ultrasound image.

The present invention further relates to a method of variable frequency ultrasound imaging of a volumetric region using such an ultrasound system.

BACKGROUND OF THE INVENTION

An ultrasound imaging system with a CMUT transducer probe is known from WO2015028314 A1. This probe comprises an array having CMUT cells arranged to operate in either of the following modes: a conventional mode, wherein a DC bias voltage sets a CMUT membrane of the cell to vibrate freely above a cell floor during operation of the CMUT cell; and a collapsed mode, wherein the DC bias voltage sets the CMUT membrane of the cell to be collapsed to the cell floor during operation of the CMUT cell. An increase in the DC bias voltage results in an increase in a center frequency of the frequency response of the CMUT cell during the operation the collapsed mode, and a decrease in the DC bias voltage results in a decrease in the center frequency of the frequency response of the CMUT cell during the operation in the collapsed mode. The DC bias voltage can be selected for different clinical applications depending on the frequency at which a volumetric region of the body is imaged.

There is need in new imaging techniques further utilizing the perspectives of

SUMMARY OF THE INVENTION

It is an object of the present invention to provide an ultrasound system, which enables improved capabilities in the ultrasound imaging.

This object is achieved according to the invention by providing a region of interest (ROI) identifier enabling to identify the region of interest on the basis of the ultrasound image data, and a drive mechanism coupled to the probe and the ROI identifier, wherein the identifier is adapted to generate identification data indicating the region of interest within the volumetric region; wherein the transducer frequency controller is further adapted to set, based on the identification data, the operation frequency to a second frequency for the ultrasound beams steered within the region of interest, the second frequency being higher than the first frequency and wherein the drive mechanism is arranged to move the probe, based on the identification data, enabling a distance between the probe and the ROI to be reduced.

The invention uses variable frequency capabilities of the CMUT transducers in providing a new imaging technique that allows increasing the frequency of the ultrasound beams within the identified region of interest. Once the ROI is identified in the ultrasound data by the ROI identifier, the transducer frequency controller increases the beam frequencies in a portion of the volumetric region in which the ROI is located. Further, the system permits the intracavity probes to be moved with respect to the volumetric region giving additional flexibility to the user during the ultrasound imaging by automatically adjusting the probe's position with respect to the volumetric region depending on the location of the identified ROI within the region. If the distance between the identified ROI and the probe is larger than the penetration depth of the acoustic beams at the selected increased frequency the system may arrange the drive mechanism to move the probe closer to the ROI, such that the detail view of the ROI with increased beam frequency may be produced.

In an embodiment, the beamformer provides the ultrasound image data having a relatively low spatial resolution within the volumetric region and relatively high spatial resolution within the region of interest.

In this embodiment increasing of the beam frequency transmitted over the region of interest allows the beamformer receiving the higher frequency echo signals originating from the ROI; thus, providing a higher resolution ultrasound data of the identified ROI. Compared to the prior art systems the ultrasound system of the present invention is capable of receiving more detailed ultrasound information on the volumetric region during an ultrasound scan.

In a further embodiment, the image processor produces a wide view of the volumetric region based of the low spatial resolution data and a detail view of the region of interest based on the high spatial resolution data.

Acoustic wave attenuation increases with increasing frequency. Therefore, it may be beneficial producing the wide view of the volumetric region with larger penetration depth but reduced spatial resolution and the detailed field view within the wide field of view, wherein the ROI can be imaged with higher spatial resolution. The advantage of the present invention that both fields of view can be produced using the same CMUT transducer array during a single ultrasound scan.

In another embodiment, the ultrasound system further comprises an image display coupled to the image processor, which displays both the wide view of the volumetric region and the detail view of the region of interest.

Both fields of view may be displayed to a user either next to each other as separate ultrasound images or in a spatial registration as one ultrasound image.

In yet another embodiment the ultrasound system further comprises a user interface coupled to the ROI identifier and responsive to a manual selection of the ROI within the volumetric region.

This gives the user an opportunity to manually select the ROI to be identified by the ROI identifier. Optionally, the user interface can be also coupled to the frequency control, such that the user can also select the relatively low and high frequencies of the beams steered within the volumetric region and within the region of interest correspondingly.

In a further embodiment the array is a two-dimensional array or one-dimensional array.

Depending on the array's design the ultrasound system may be providing the three dimensional ultrasound images or two dimensional ultrasound images (2D slices) of the volumetric region.

DETAILED DESCRIPTION OF EMBODIMENTS

Figure 1:
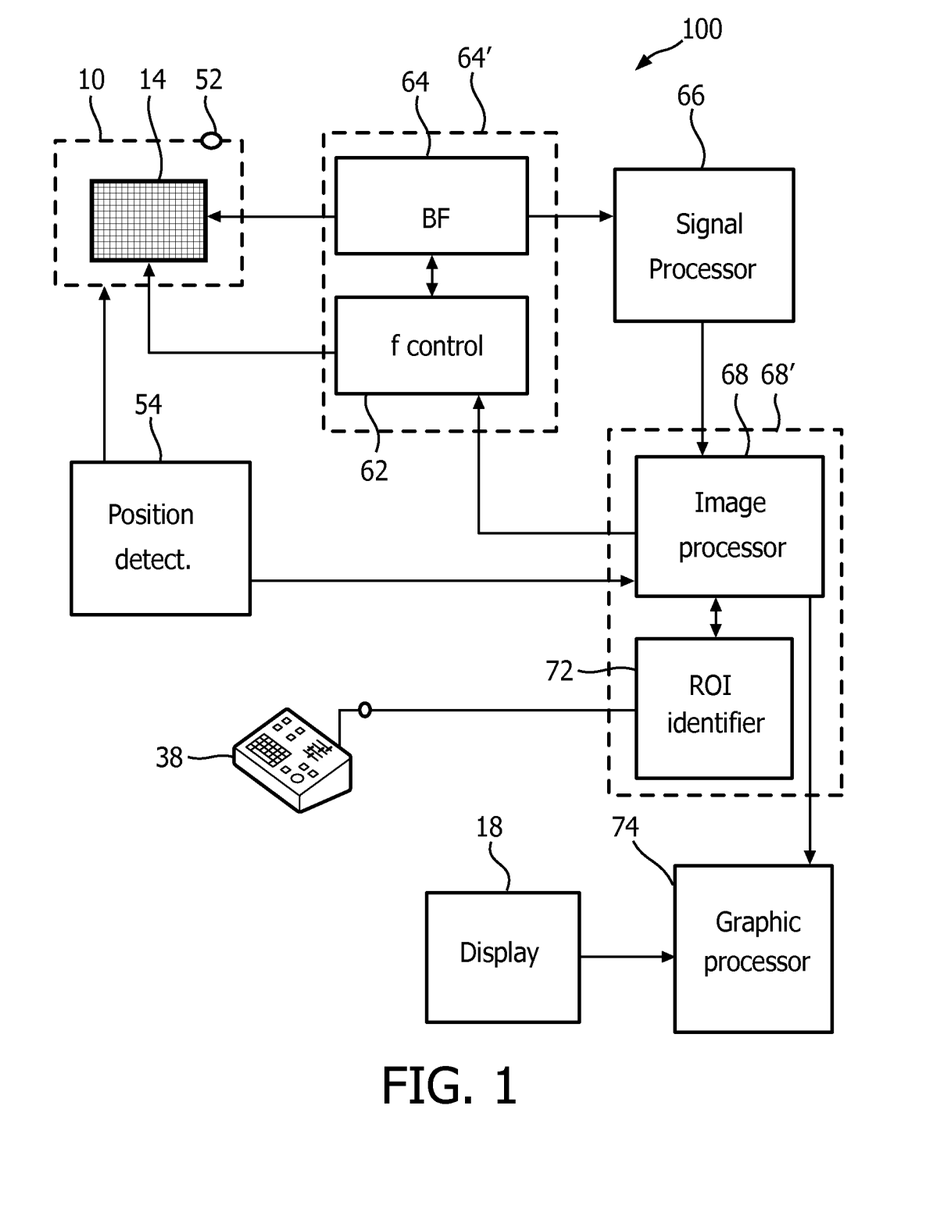
FIG. 1 illustrates an ultrasound system for variable frequency imaging of a volumetric region in accordance with the principles of the present invention.

FIG. 1 shows schematically and exemplarily an ultrasound system 100 for variable frequency imaging of a volumetric region in accordance with the principles of the present invention. A probe 10 may comprises an array 14 of variable frequency ultrasound transducers such as for example capacitive micromachined ultrasound transducers (CMUTs). This array 14 can be either two dimensional or one dimensional array. The CMUTs of the array transmit ultrasound beams in a variable frequency range over a volumetric field of view 131 (FIG. 5) (comprising the volumetric region) and receive echoes in response to the 64, which controls a steering of the ultrasound beams transmitted by the CMUTs of the array transducer 14. The beamformer further beamforms echoes received by the transducers. Beams may be steered straight ahead from (orthogonal to) the transducer array 14, or at different angles for a larger field of view. Optionally, the ultrasound system may have a plurality of microbeamformers (not shown) each coupling groups of the individual transducers with the beamformer 64. The microbeamfomers (sub-array beamformer) partially beamforms the signals from the groups of the transducers thereby reducing amount of signal channels coupling the probe and main acquisition system. The microbeamformers are preferably fabricated in integrated circuit form and located in the housing of the probe 10 near the array transducer. The probe 10 may further include a position sensor 52 which provides signals indicative of the position of the probe 10 to a transducer position detector 54. The sensor 52 may be a magnetic, electromagnetic, radio frequency, infrared, or other type of sensor.

The partially beamformed signals produced by the microbeamformers are forwarded to a beamformer 64 where partially beam-formed signals from individual groups of transducers are combined into a fully beam-formed signal. The ultrasound system 100 further comprises a transducer frequency controller 62 coupled to the CMUT array 14 and the beamformer 64 (or optionally to the plurality of microbeamformers). The frequency controller 62 controls the frequency of the transmitted and received ultrasound beams via adjusting a resonance frequency of each CMUT transducer in the array 14, as will be described more detailed below. The fully beam-formed signal (i.e. coherent echo signals along the beams) represent ultrasound image data, which are processed by filtering, amplitude detection, Doppler signal detection, and other processes by a signal processor 66. The ultrasound data are then processed into ultrasound image signals in the coordinate system of the probe (r,θ,φ for example) by an image processor 68. The ultrasound image signals may be further converted to a desired ultrasound image format (x,y,z Cartesian coordinates, for example) by a graphic processor 74 and displayed on a display 18.

A region of interest identifier 72 is coupled to the image processor 68 and, based on analyses of the ultrasound image data, is adapted to generate identification data indicating a region of interest 82' (ROI) within the volumetric field of view 131. Both the image processor 68 and the ROI identifier 72 can be a part of one image analyses unit 68'. The ultrasound imaging system 100 may be controlled by a user interface 38. In particular the user interface 38 can be connected to the ROI identifier 72 or directly to the image analyses displayed on the display. Further, a user via the user interface 38 also select a desired frequency within a variable frequency range of the array, with which the user wishes the ROI to be imaged. This user input, such as location and size of the ROI 82' within the volumetric field of view 131 and the desired ROI imaging frequency, in a shape of the identification data is communicated by the image analyses unit 68' to the transducer frequency controller 62. In the present embodiment the user identified parameters are exchanged between the ROI identifier and the image processor 68, wherein the image processor computes coordinates of the ROI 82' and a volumetric region 132 surrounding the identified ROI in the volumetric field of view 131 based on the generated identification data provided by the ROI identifier. The transducer frequency controller 62 is responsive to the identification data generated by the ROI identifier 72 and processed by the image processor 68. The transducer frequency controller 62 together with the beamformer adjusts the frequency of the beams steered within a volumetric region 132 surrounding the identified ROI in the volumetric field of view 131. The beamformer and the transducer frequency controller can be designed as one variable frequency beamformer unit 64' combining the frequency variation and beamforming capabilities. In the alternative embodiment, the microbeamformer may be combined together the transducer frequency controller 62 into the variable frequency beamformer unit 64' and may be located within a housing of the probe.

In accordance with the present invention the variation of the imaging frequency of the ultrasound system is provided using CMUT transducers adapted to operate in a collapsed mode. CMUT technology allows the tuning of the imaging frequency by changing the bias voltage. This frequency range extends over a broad range and on top of this range at each frequency there is also a bandwidth which for a substantial part is close to 100%. This large frequency variability allows for imaging over a wide range of penetrations and resolutions.

The CMUT transducer array 14 of the present invention comprises a plurality of CMUT cells (transducers). Each CMUT cell 103 typically comprises a flexible membrane or diaphragm 114 suspended above a silicon substrate 112 with a gap or cavity 118 there between. A top electrode 120 is located on the diaphragm 114 and moves with the diaphragm. A bottom electrode is located on the floor of the cell on the upper surface of the substrate 112 in this example. Other realizations of the electrode 120 design can be considered, such as electrode 120 may be embedded in the membrane 114 or it may be deposited on the membrane 114 as an additional layer. In this example, the bottom electrode example. Other suitable arrangements, e.g. other electrode shapes and other locations of the bottom electrode 122, e.g. on the substrate layer 112 such that the bottom electrode 112 is directly exposed to the gap 118 or separated from the gap 118 by an electrically insulating layer or film to prevent a short-circuit between the top electrode 120 and the bottom electrode 122. In addition, the membrane layer 114 is fixed relative to the top face of the substrate layer 112 and configured and dimensioned so as to define a spherical or cylindrical cavity 118 between the membrane layer 114 and the substrate layer 112. It is noted for the avoidance of doubt that in FIG. 2 the bottom electrode 122 is grounded by way of non-limiting example. Other arrangements, e.g. a grounded top electrode 120 or both top electrode 120 and bottom electrode 122 floating are of course equally feasible.

Figure 2:
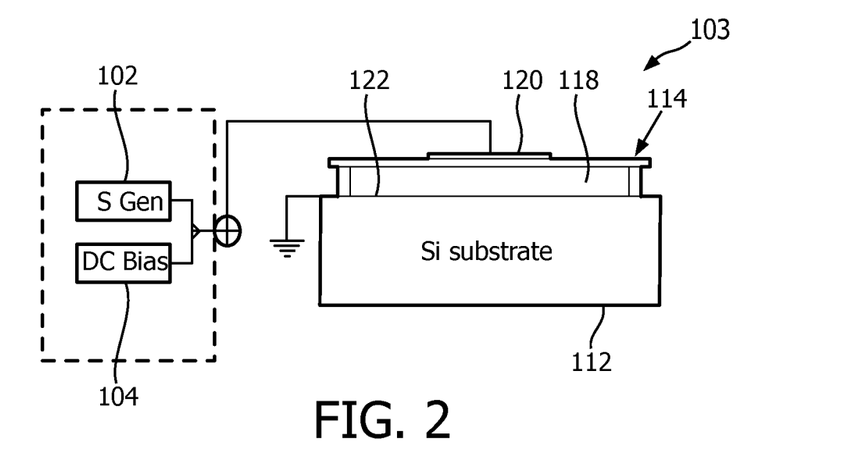
FIG. 2 illustrates a CMUT cell controlled by a DC bias voltage and driven by an r.f. drive signal.

The cell 100 and its cavity 118 may exhibit alternative geometries. For example, cavity 118 could exhibit a rectangular or square cross-section, a hexagonal cross-section, an elliptical cross-section, or an irregular cross-section. Herein, reference to the diameter of the CMUT cell 103 shall be understood as the biggest lateral dimension of the cell.

The bottom electrode 122 may be insulated on its cavity-facing surface with an additional layer (not pictured). A preferred electrically insulating layer is an oxide-nitride-oxide (ONO) dielectric layer formed above the substrate electrode 122 and below the membrane electrode 120 although it should be understood any electrically insulating material may be contemplated for this layer. The ONO-dielectric layer advantageously reduces charge accumulation on the electrodes which leads to device instability and drift and reduction in acoustic output pressure.

An example fabrication of ONO-dielectric layers on a CMUT is discussed in detail in European patent application EP 2,326,432 A2 by Klootwijk et al., filed Sep. 16, 2008 and entitled "Capacitive micromachined ultrasound transducer." Use of the ONO-dielectric layer is desirable with pre-collapsed CMUTs, which are more susceptible to charge retention than CMUTs operated with suspended membranes. The disclosed components may be fabricated from CMOS compatible materials, e.g., Al, Ti, nitrides (e.g., silicon nitride), oxides (various grades), tetra ethyl oxysilane (TEOS), poly-silicon and the like. In a CMOS fabrication, for example, the oxide and nitride layers may be formed by chemical vapor deposition and the metallization (electrode) layer put down by a sputtering process.

Suitable CMOS processes are LPCVD and PECVD, the latter having a relatively low operating temperature of less than 400° C. Exemplary techniques for producing layer 114 before adding a top face of the membrane layer 114. Other fabrication details may be found in U.S. Pat. No. 6,328,697 (Fraser).

In FIG. 2, the diameter of the cylindrical cavity 118 is larger than the diameter of the circularly configured electrode plate 122. Electrode 120 may have the same outer diameter as the circularly configured electrode plate 122, although such conformance is not required. Thus, the membrane electrode 120 may be fixed relative to the top face of the membrane layer 114 so as to align with the electrode plate 122 below. The electrodes of the CMUT cell 100 provide the capacitive plates of the device and the gap 118 is the dielectric between the plates of the capacitor. When the diaphragm vibrates, the changing dimension of the dielectric gap between the plates provides a changing capacitance which is sensed as the response of the CMUT cell 100 to a received acoustic echo.

The spacing between the electrodes is controlled by applying a static voltage, e.g. a DC bias voltage, to the electrodes with a voltage supply 45. The voltage supply 45 is implemented into the transducer frequency controller 62 and provides its frequency control capabilities. The transducers of the array 14 each may have a separate voltage supply or share several voltage supplies implemented in the transducer frequency controller 62. The voltage supply 45 may also optionally comprise separate stages 102, 104 for providing the DC and AC or stimulus components respectively of the drive voltage of the CMUT cells 103. The first stage 102 may be adapted to generate the static (DC) voltage component and the second stage 104 may be adapted to generate an alternating variable voltage component or stimulus having a set alternating frequency, which signal typically is the difference between the overall drive voltage and the aforementioned static component thereof. The static or bias component of the applied drive voltage preferably meets or exceeds the threshold voltage for forcing the CMUT cells 103 into their collapsed states. This has the advantage that the first stage 102 may include relatively large capacitors, e.g. smoothing capacitors, in order to generate a particularly low-noise static component of the overall voltage, which static component typically dominates the overall voltage such that the noise characteristics of the overall voltage signal will be dominated by the noise characteristics of this static component. Other suitable embodiments of the voltage source supply 45 should be apparent, such as for instance an embodiment in which the voltage source supply 45 contains three discrete stages including a first stage for generating the static DC component of the CMUT drive voltage, a second stage for generating the variable DC component of the drive voltage and a third stage for generating the frequency modulation or stimulus component of the signal, e.g. a pulse circuit or the like. It is summarized that the voltage source supply 45 may be implemented in any suitable manner.

As is known per se, by applying a static voltage above a certain threshold, the CMUT cell 103 is forced into a collapsed state in which the membrane 114 collapses onto the substrate 112. This threshold value may depend on the exact design of the CMUT cell 103 and is defined as the DC bias voltage at which the membrane 114 sticks to (contacts) the cell floor by Van der Waal force during the application of the bias voltage. The amount (area) of contact between the membrane 114 and the substrate 112 is dependent on the applied bias voltage. Increasing the contact area between the membrane 114 and the substrate 112 increases the resonance frequency of the membrane 114, as will be explained in more detail with the aid of FIG. 3a-d.

Figure 3A:
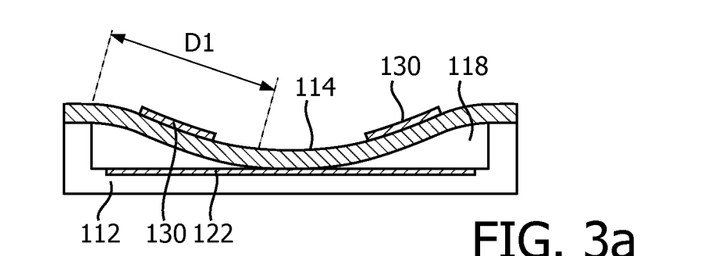
FIGS. 3a-3d illustrate the principles of collapsed mode CMUT operation applied in an implementation of the present invention.
Figure 3B:
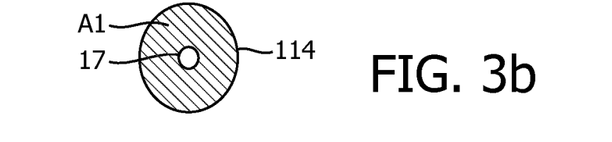
Figure 3C:
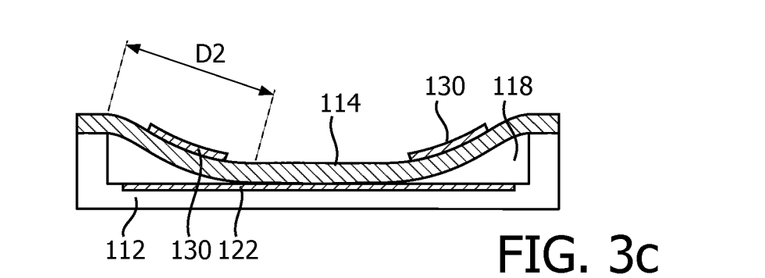

The frequency response of the collapsed mode CMUT cell 103 may be varied by adjusting the DC bias voltage applied to the CMUT electrodes after collapse. As a result, the resonant frequency of the CMUT cell increases as a higher DC bias voltage is applied to the electrodes. The principles behind this phenomenon are illustrated in FIGS. 3a and 3b. The cross-sectional views of FIGS. 3a and 3c illustrate this one-dimensionally by the distances D1 and D2 between the outer support of the membrane 114 and the point where the membrane begins to touch the floor of the cavity 118 in each illustration. It can be seen that the distance D1 is a relatively long distance in FIG. 3a when a relatively low bias voltage is applied, whereas the distance D2 in FIG. 3c is a much shorter distance due to a higher bias voltage being applied. These distances can be compared to long and short strings which are held by the ends and then plucked. The long, relaxed string will vibrate at a much lower frequency when plucked than will the shorter, tighter string. Analogously, the resonant frequency of the CMUT cell in FIG. 3a will be lower than the resonant frequency of the CMUT cell in FIG. 3c which is subject to the higher pulldown bias voltage.

Figure 3D:
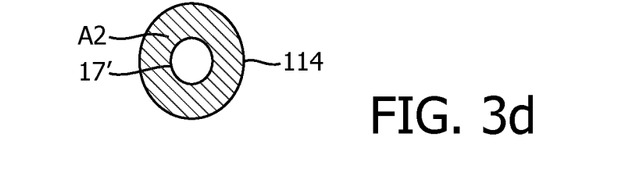

The phenomenon can also be appreciated from the two-dimensional illustrations of FIGS. 3b and 3d, as it is in actuality a function of the effective operating area of the CMUT membrane. When the membrane 114 just touches the floor of the CMUT cell as shown in FIG. 3a, the effective vibrating area A1 of the non-contacting (free vibrating) portion of the cell membrane 114 is large as shown in FIG. 3b. The small hole in the center 17 represents the center contact region of the membrane. The large area membrane will vibrate at a relatively low frequency. This area 17 is an area of the membrane 114, which is collapsed to the floor of the CMUT cell. But when the membrane is pulled into deeper results in a lesser free vibrating area A2 as shown in FIG. 3d. This lesser area A2 will vibrate at a higher frequency than the larger A1 area. Thus, as the DC bias voltage is decreased the frequency response of the collapsed CMUT cell decreases, and when the DC bias voltage increases the frequency response of the collapsed CMUT cell increases.

Figure 4:
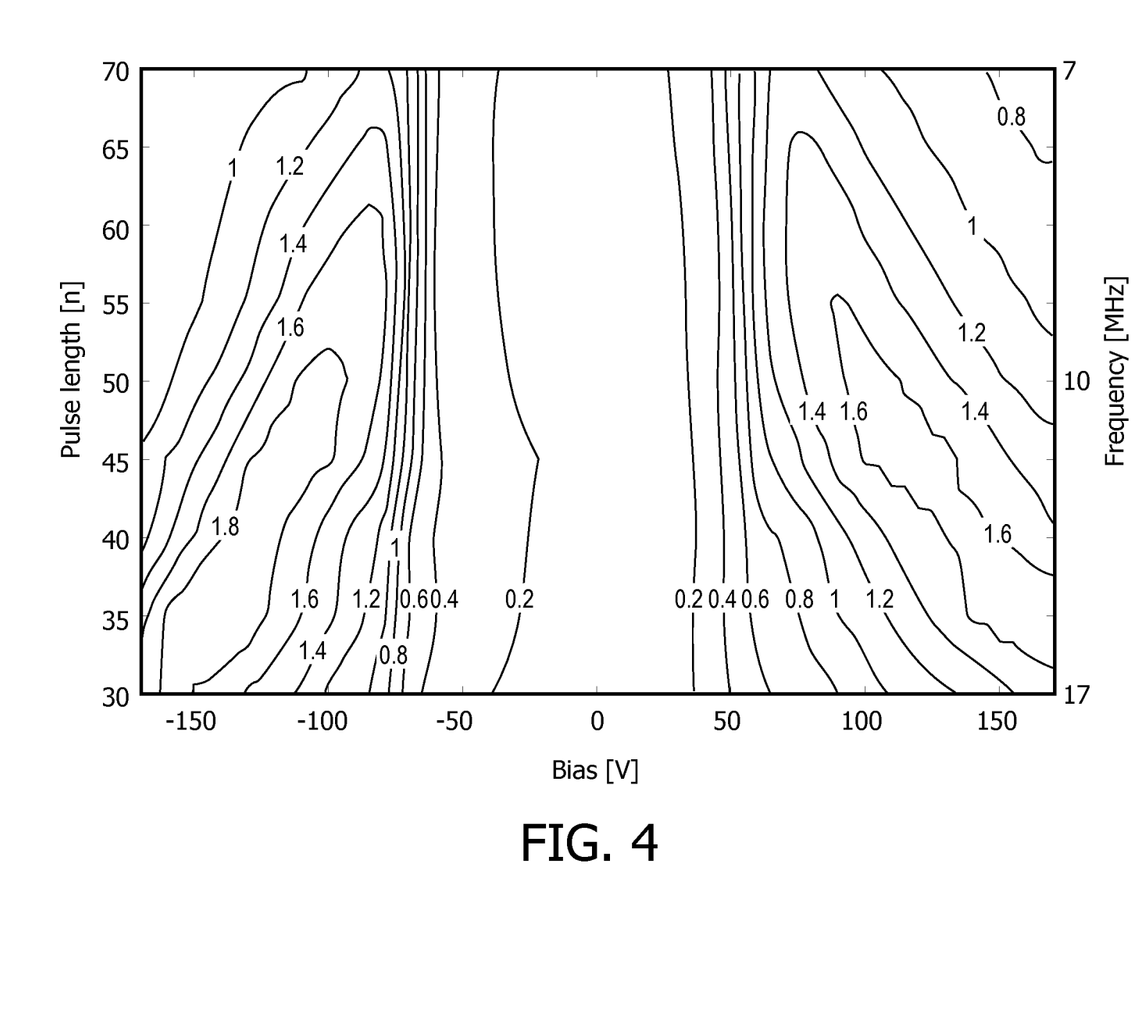
FIG. 4 illustrates a contour plot of the acoustical performance of such the CMUT cell operating in collapsed mode.

FIG. 4 shows a contour plot of the acoustical pressure output of a typical CMUT cell 103 in collapse mode as a function of applied DC bias voltage including a stimulus in the form of an AC modulation or frequency modulation of constant frequency during transmission. The corresponding pulse length is half the applied frequency. As can be seen from this contour plot, when the CMUT cell 103 is operated at a fixed or static voltage, e.g. a DC bias voltage of static value, optimal acoustic performance is obtained for a small range of frequencies only. However, when varying the bias voltage and the frequency modulation on the bias voltage signal in a correlated manner, as indicated by the dashed line in the contour plot, the optimal acoustic performance of the CMUT cell 103 may be achieved over a much larger frequency range, thereby increasing the effective bandwidth of the ultrasound pulse (or pulse train) generated in the transmission mode of the ultrasound probe including the CMUT cell 103. Thus, frequency can be varied in a frequency range from 7 to 17 MHz, as in this example; 3 to 10 MHz; or even larger frequency range expanding from 2 to 15 MHz.

This can be understood in back reference to FIGS. 3a and 3d, which explained that the resonance frequency of the CMUT cell 103 in a collapsed state is a function of the applied (DC) bias voltage. By adjusting the applied bias voltage when generating ultrasonic pulses of a particular set frequency by applying a stimulus having the appropriate set frequency, pulses of different frequencies can be generated exhibiting (near-)optimal acoustic performance of the CMUT cell 103 for each pulse frequency. This therefore ensures (near-) optimal imaging resolution over a large bandwidth of the imaging spectrum.

Acoustic wave attenuation increases with increasing frequency, while ultrasound image resolution reduces with increasing frequency. For example, a typical depth and axial resolution for a two-cycle pulse in tissue is given in the table below:

| Frequency (MHz) | Image depth (cm) | Axial resolution (mm) |
| --- | --- | --- |
| 2 | 30 | 0.77 |
| 5 | 12 | 0.31 |
| 7.5 | 8 | 0.2 |
| 10 | 6 | 0.15 |
| 15 | 4 | 0.1 |

To meet optimal and penetration requirements reasonably, the frequency range for most diagnostic applications is 2 to 15 MHz. The lower portion of the range is useful when increased depth (e.g., the region of interest is located deeper in body) or high attenuation (e.g., in transcranial studies) is encountered. The higher portion of the frequency range is useful when little penetration is required (e.g. in imaging breast, thyroid, or superficial vessel or in pediatric imaging). In most large patients, 3-5 MHz is a satisfactory frequency, whereas in thin patients and in children, 5 and 7.5 MHz often can be used. A higher frequency range above 15 MHz can provide high resolution imaging using intracavity (intravascular) probes, such as IVUS, ICE, FL-ICE. These probes can be positioned closer to the ROI inside body cavities, vessel, etc.

The present invention provides a unique combination of a variable frequency ultrasound imaging in a broad frequency range using a single array 14 of the CMUT transducers.

Figure 5:
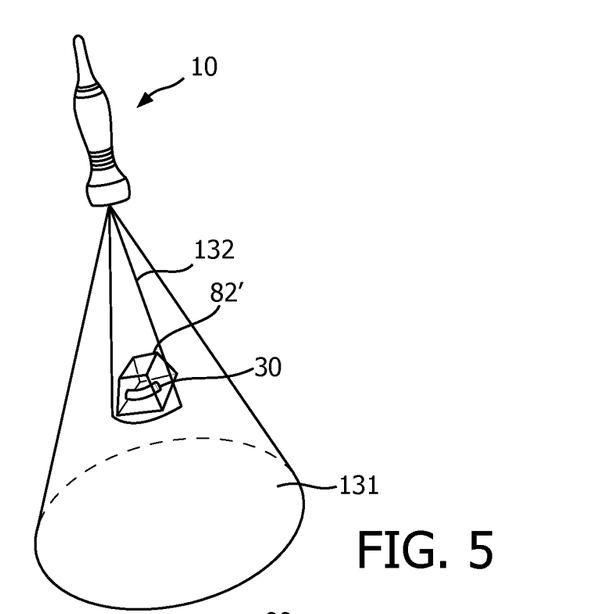
FIG. 5 illustrates the scanning of the volumetric region with a relatively low frequency of the ultrasound beams steered within the volumetric region outside of the region of interest and a relatively high frequency of the ultrasound beams steered within the region of interest.
Figure 6:
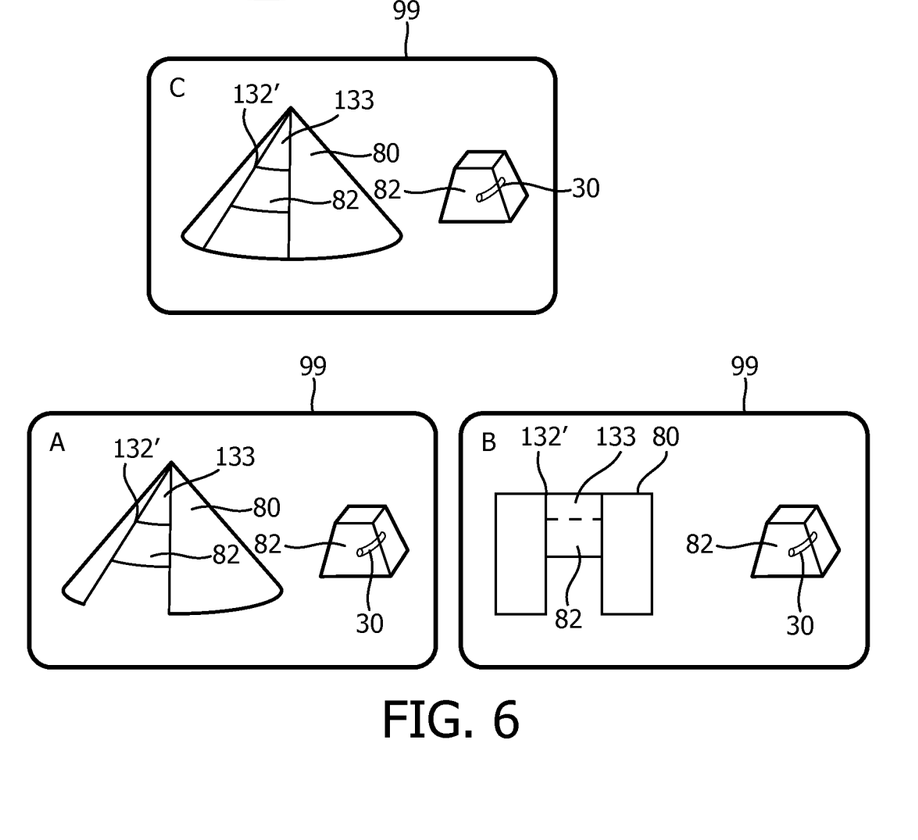
FIG. 6a-b illustrate displays of ultrasound images of a volumetric region together with the wide view of the volumetric region comprising the detail view of the region of interest.

FIG. 5 illustrates a basic principle of the present invention with a fixed probe's position with respect to the ROI 82'. The probe 10 is used to acquire ultrasound images of the volumetric field of view 131. The transducer frequency controller 62 is responsive to the region of interest identifier 72 sets a relatively low frequency of the ultrasound beams steered within the volumetric field of view 131 and a relatively high frequency of the ultrasound beams steered within the volumetric region 132 surrounding the identified ROI 82'. The received by the CMUTs echoes are processed by the beamformer, which provides the ultrasound image data of the volumetric region having a relatively low spatial resolution within the volumetric region outside of the ROI and relatively high spatial resolution within a wide view 80 of the volumetric region based on the low spatial resolution data and a detail view 132' of the region of interest 82 based on the high spatial resolution data are produced as shown in FIG. 6. The detail view 132' of the volumetric region 132 surrounding the identified ROI 82 may also comprise an image 133 of the area located in between the probe and the ROI.

FIG. 6 illustrates a display 99 of 2D ultrasound images displayed to the user with the wide view 80 and the detail view 132' in spatial registration with respect to each other. A representation 82 of the selected ROI 82' is displayed at the increased imaging frequency in the detail view 132'. Since the penetration depth of the ultrasound beams with relatively high frequency is reduced compared to the penetration depth of the ultrasound beams with the relatively low frequency, an upper frequency limit of the relatively high frequency range will be limited by a depth (distance to the probe) at which the ROI is located and will be taken into account by the image processor 68 during its computation. The system 100 may first acquire ultrasound data of the volumetric field of view with the relatively low beam frequencies, thus providing surrounding context of the volumetric region, and further "zoom-in" to the ROI 82 upon its identification. The detail view 132' of the ROI 82 can be updated in the real time next to the wide view 80 acquired previously and displayed for the context as illustrated in FIG. 6c.

Alternatively, the detail view 132' of the ROI 82 and the wide view 80 can be displayed next to each other. In cardiology application during heart imaging the display and acquisition of the ultrasound images may be synchronized with heart cycle by an ECG gating.

In case the CMUT array 14 is a linear arrays the transducer frequency controller 62 can address (drive) the individual transducer cells 103 with different frequencies so that the ROI is imaged at high frequency and that the other elements are maintained at low frequencies. A representative image acquired with the linear array is shown in FIG. 6b.

An embedded real time high frequency detail view 132' image is generated simultaneous to a real time low frequency wide view 80 image. This has the advantage that the surrounding context is still imaged (albeit at lower solution) in real time with relatively higher depth to allow for example orientation and navigation of tools that occur in the periphery of the ROI. It is also possible to obtain similar images if the CMUT array 14 is a phased array as shown in FIG. 6a and FIG. 6c. In the phased array case the beamforming is the transducers is chosen such that a high frequency detail view 132' image is imbedded in the wide view 80 image containing lower frequency lines. If both views: the detail view 132' of the ROI 82 and the wide view 80 are updated in real time, the system comprising the phased array can continually acquire first all lines of the volumetric field of view 131 volume at low frequency and then all lines the volumetric region 132 surrounding the identified ROI 82 with higher frequency. The acquired view can by further interleaved or interpolated into one ultrasound image. This is illustrated in FIG. 6c. In alternative acquisition workflow the wide view 80 is updated beyond detail view 132', wherein the resulting image displayed to the user is illustrated in FIG. 6a. The former has the advantage of real time views of the whole volume eg. to track interventional devices. The latter has the advantage that less lines are acquired and a higher frame rate can be achieved.

Figure 7:
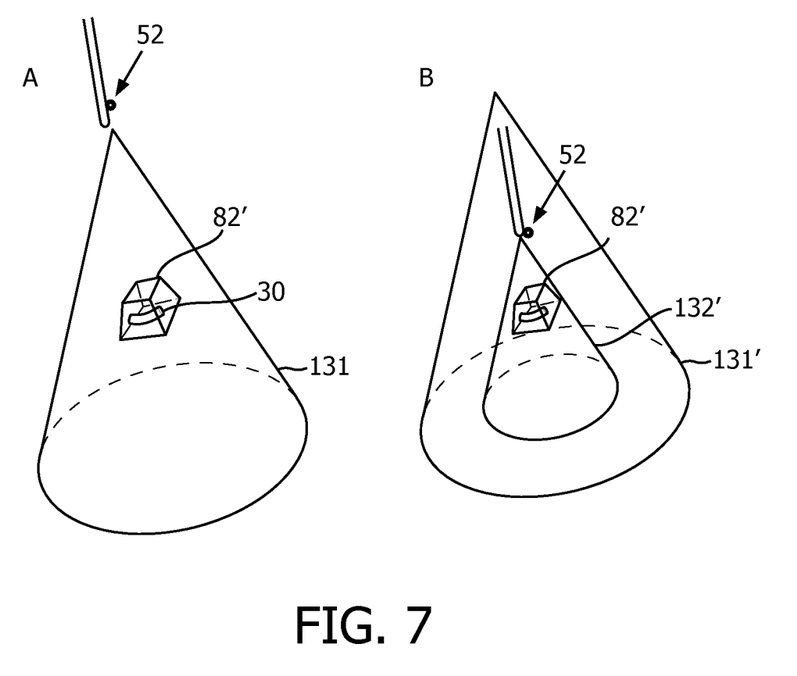
FIG. 7a-b illustrates the scanning of the volumetric region with variable beam frequency using an intracavity probe adapted to be moved with respect to the volumetric region.

FIG. 7 illustrates an embodiment of the present invention, wherein the probe's position can be varied within the volumetric field of view 131'. The probe, for example, can be placed in a forward looking or end firing configuration such that the probe can be easily translatable towards and away from the ROI. This can be realized by providing the intracavity probe such as IVUS (intravascular ultrasound), ICE (intracardiac echocardiography), FL-ICE (forward looking intracardiac echocardiography), for example as described in EP1742580B.

Figure 9:
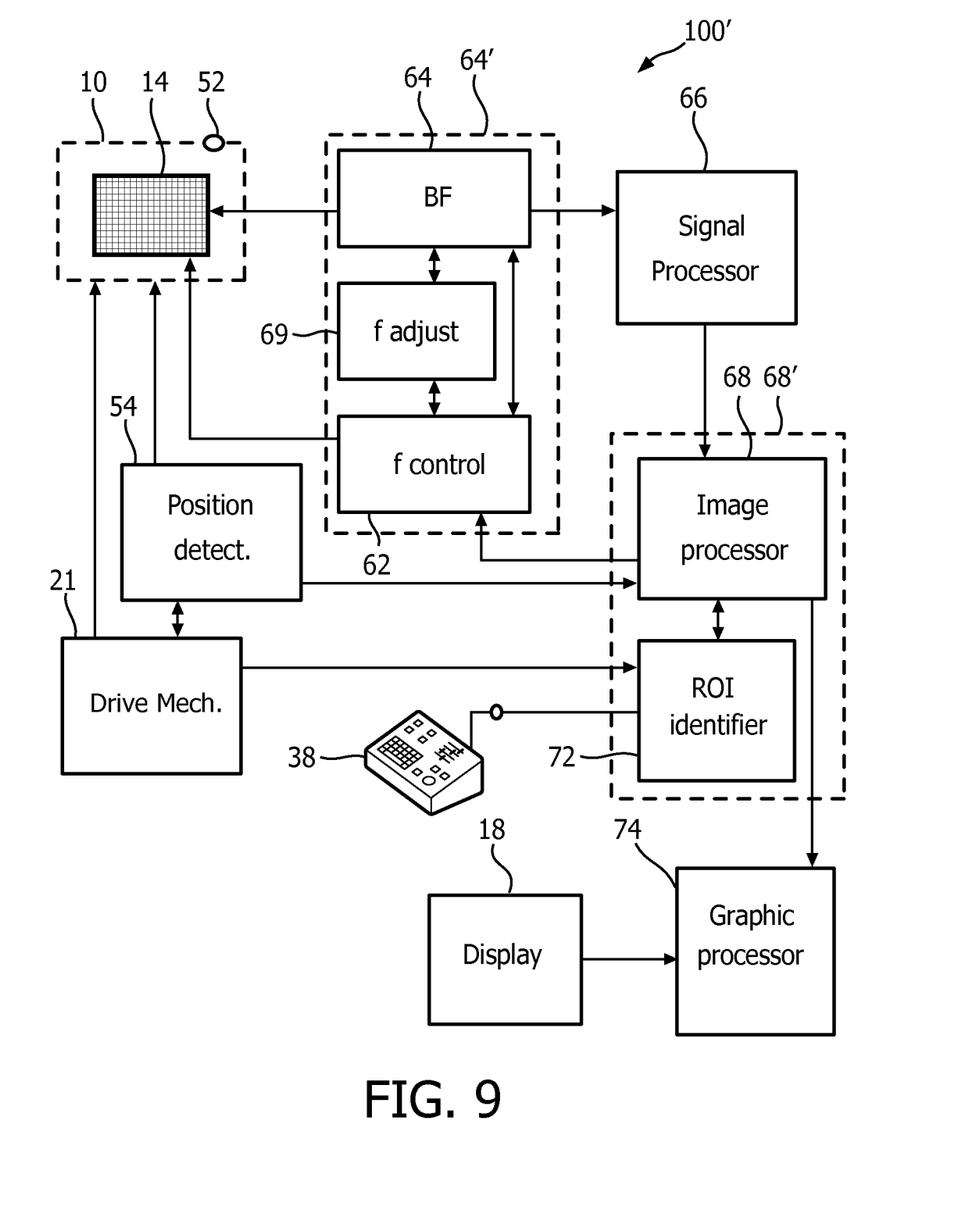
FIG. 9 illustrates an ultrasound system for imaging a volumetric region comprising a region of interest in accordance the present invention.

The intracavity probe may include the transducer array in the distal tip which is swept to scan a volumetric region. The volume sweeping can be done either providing a mechanical movement of the 1D array or an electronic steering of the beams with the 2D array. The transducer array is contained within a fluid chamber located at the distal tip of the probe, wherein fluid provides an appropriate acoustic coupling between the probe and the imaged volumetric region. In FIG. 9 the ultrasound system 100' of the present invention is schematically shown. The system 100' may further comprise a drive mechanism 21 coupled to the probe and the ROI identifier 72 (optionally to the analyses unit 68'), wherein the drive mechanism based on the identification data acts to move the probe 10 during imaging. The drive mechanism 21 also receives the signals from the position sensor 52, which tracks the probe's spatial location, thus providing the probe's movement within the volumetric field of view 131'. This embodiment gives a higher flexibility to the upper limit of the high frequencies with which the ROI 82' can be imaged. Once the ROI is identified the image processor 68 computes coordinates of the ROI 82 and a volumetric region 132 surrounding the identified ROI in the volumetric field of view 131 based on the based on the identification is beyond the penetration depth of the beams with the selected high frequency, the drive mechanism 21 would be communicated to move closer towards the ROI within the volumetric field of view 131' (FIG. 7b), such that a "zoom-in" image of the ROI can be acquired.

This invention combines benefits of miniaturized CMUT transducers (enabled by advances in CMOS manufacturing) and their broad operation band (enabled by the collapsed mode of operation) with a feedback loop to the driving device providing a user with a new generation of ultrasound system capable of automatically zooming-in and out function within the volumetric region. A combination of the wide frequency band of the CMUT array operating in the collapsed mode with means to physically translate the probe comprising this array enables a new user experience in advanced ultrasound imaging with increased details and therefore improved diagnostic imaging.

Figure 8:
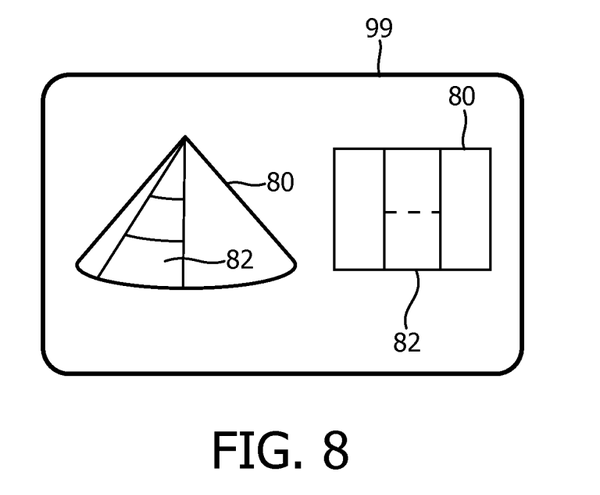
FIG. 8 illustrates display of ultrasound images obtained with an intracavity probe in accordance with the principles of the present invention.

FIG. 8 illustrates a display 99 of 2D ultrasound images displayed to the user. The detail 82 and wide views 80 may be shown either next to each other or in a spatial registration. The latter case is illustrated in FIG. 8, wherein the images obtained with the linear and phased arrays are placed next to each other. Compared to FIGS. 6a-b the detail view 82 would appear to the user as having a larger penetration depth compared to the embodiment, wherein the probe's position is fixed with respect to the ROI's location. The detail view image can be continuously acquired during the probe's progression (movement), such that the wide view image 80 can be real-time updated with higher resolution detailed view images 82 acquired at different points of time. In addition, a current position of the moving probe within the volumetric region can be displayed in the wide view image 80.

Based on the ROI identification and the user identified parameters the image processor 68 may analyze the obtained ultrasound data for image quality parameters such as axial noise, lateral speckle, axial intensity etc. These quality parameters may be further displayed to the user. These quality parameters can also be used as an input to the drive mechanism to automatically move the probe so that it can be part of a feedback loop for automatic optimization of the ROI image quality. Such automation may be used for a fine movement of the probe, while the gross motion can be controlled via the user interface. Via the user interface 38 the user can be provided an additional control on the drive mechanism operation. The user interface can be a touch screen associated with the display, which permits the user to manually define in a displayed image the ROI and/or probe's movement. Touching on the ROI and/or making the "pinch-in" or "pinch-out" movement can be used to physically move the probe in a certain direction(s) or acquires the detailed image if the penetration depth is sufficient for the given probe's position.

In an alternative embodiment a real time detailed 3D field of view of the ROI obtained with relatively high frequency is imbedded within a wide view 2D image. This has the advantage that acquiring the wide view 2D image consumes less processing power and transducer utilization and that the 3D image (or biplane ROI) can be obtained at the highest possible frame rate. For the arrays with small aperture in one dimension (e.g., ICE), this embodiment provide the wide view imaging based on the more favorable aperture dimensions (ICE axial, and lateral) and the detailed ROI imaging at all dimensions (e.g. ICE: including elevation), which becomes more favorable at high frequency.

The ROI identifier can identify the ROI automatically using ultrasound data from a specific object such as a catheter, needle or tool which can optionally be marked with ultrasound enhancing contrast features. These objects by virtue of their geometry and aspect (or markers or positional sensor) can be recognized by the image analyses unit 68' and the coordinates of the ROI can be automatically generated.

In another embodiment an image of a volume of interest can be acquired initially with relatively high frequency beams, this volume of interest can be identified by the user as the ROI. Further, the user via the user interface can decrease the imaging frequency, relative to what was used for the ROI, in order to obtain a wide view image with higher penetration depth, wherein the wide view image comprises the ROI. Similar to previous embodiments these fields of view may be displayed either next to each other or in the spatial registration.

Separate requirements may be imposed onto an integrated circuit (IC) electronics of the variable frequency beamformer unit 64' (or optionally of the transducer frequency controller 62) in order to provide an optimal speed of the bias-voltage change applied to the CMUTs. For most instances described above current IC electronics technology may be sufficient. Alternatively, in case even larger speed of the bias-voltage change is needed the 3-terminal CMUT as described in WO/2015/086413 in may be used.

Figure 10:
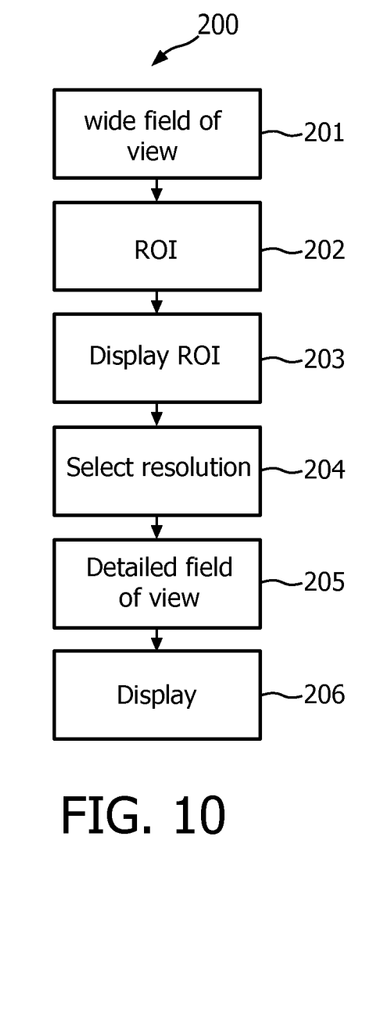
FIG. 10 illustrates a workflow of a basic principle of variable frequency image acquisition of the present invention.

In FIG. 10 illustrates a workflow 200 of a basic principle of variable frequency image acquisition. At step 201 the volumetric field of view 131 is imaged this field of view comprises the wide view 80. In step 202 the ROI 82 is detected by the identifier, the automatic detection can be performed based on distinguishing anatomy feature 30, for example, or based on the user input. In step 203 outlines of the ROI may be displayed to the 100 adjusting the size and/or location of the ROI. Further, in step 204 the user can select the desired resolution (or frequency) of the detail view of the ROI. The image processor 68 further translates the selected resolution into the transducer operation frequency. Alternatively, in this step the image processor 68 can compute an upper frequency limit, with which the ROI 82 can be imaged based on the fixed distance from the probe 10 (namely the transducer array 14 within the probe) to the ROI. This information may be displayed on the display. In step 205 the system 100 would acquire the detail view of the ROI with increased resolution. In step 206 the wide and detailed fields of view are displayed to the user.

Figure 11:
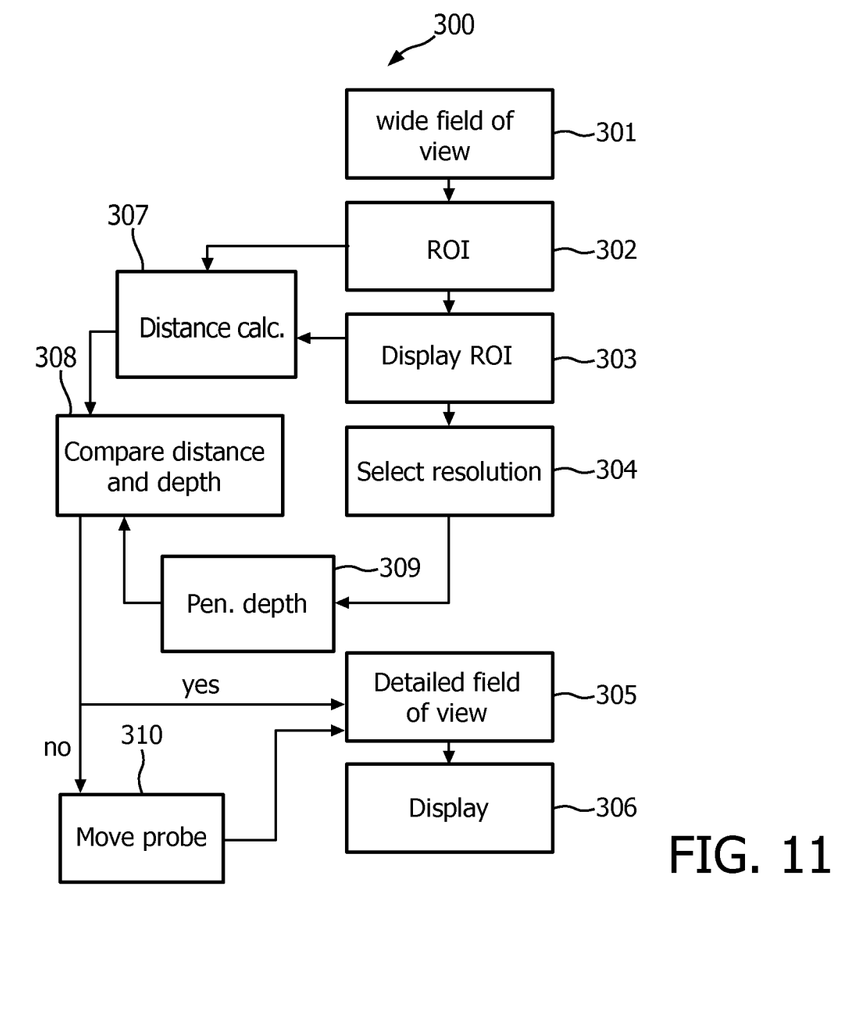
FIG. 11 illustrates a workflow for variable frequency image acquisition in accordance with the present invention.

In FIG. 11 illustrates a workflow 300 for variable frequency image acquisition in accordance with the present invention. At step 301 the volumetric field of view 131 is acquired. In step 302 the ROI 82 is detected by the identifier. In step 303 outlines of the ROI may be displayed to the user. At this stage the user can also manually interact via the user interface 38 with the systems 100' adjusting the size and/or location of the ROI. In parallel, in step 307 the image processor 68 computes the distance from the probe to the most distant edge of RIO. Further, in step 304 the user can select the desired resolution (or frequency) of the detail view of the ROI. In step 309 Based on this information the image processor 68 computes the penetration depth corresponding to the selected resolution (frequency). In step 308 the distance between the probe and the ROI is compared to the penetration depth. If the computed penetration depth is larger than the distance to the ROI, then the workflow is followed by step 305, in which the system 100 acquires the detail view of the ROI with the selected resolution. If the computed penetration depth is smaller than the distance to the ROI, then the workflow is followed by step 310, in which the drive mechanism provides probe's movement towards the ROI's location. A movement distance is determined by the ROI location and the selected resolution. In case the movement distance is limited by an anatomy of the imaged volume (object), such that the probe cannot be moved further, the system 100' may provide a feedback to the user with a computed optimal resolution at which the ROI can be acquired taking into account anatomy limitations. Further, system 100 acquires the detail view of the ROI with the selected resolution or optimal suggested resolution in step 305. In step 306 the wide and detailed fields of view are displayed to the user.

It shall be understood by the person skilled in the art that the principles of the present invention can be practiced in both 2D and 3D ultrasound imaging.

A single unit or device may fulfill the functions of several items recited in the claims. The mere fact that certain measures are recited in mutually different dependent claims A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. An ultrasound system for imaging a volumetric region comprising a region of interest comprising:
   a probe suitable for intracavity imaging and having an array of CMUT transducers adapted to steer ultrasound beams in a variable frequency range over the volumetric region;
   a beamformer coupled to the array and adapted to control ultrasound beam steering and provide ultrasound image data of the volumetric region;
   a transducer frequency controller coupled to the beamformer and adapted to, in operation, vary operation frequencies of the CMUT transducers within the variable frequency range, wherein the transducer frequency controller is arranged to set the operation frequencies of the CMUT transducers to a first frequency in the variable frequency range for the ultrasound beams steered in the volumetric region;

an image processor configured to receive the ultrasound image data and produce an ultrasound image based on the received ultrasound image data;

a region of interest (ROI) identifier configured to:
identify a region of interest on the basis of the ultrasound image data; and
generate identification data indicating the region of interest within the volumetric region; and a drive mechanism coupled to the probe and the ROI identifier which acts to move the probe during operation;

wherein the transducer frequency controller is further adapted to automatically change, based on the identification data, the operation frequencies of the CMUT transducers from the first frequency to a second frequency in the variable frequency range for the ultrasound beams steered within the region of interest, the second frequency being higher than the first frequency; and wherein the drive mechanism is adapted, while the ultrasound beams are steered within the region of interest, to translate the probe based on the identification data, enabling a distance variation between the probe and the region of interest.

2. The ultrasound system according to claim 1, wherein the beamformer provides the ultrasound image data having a relatively low spatial resolution within the volumetric region and relatively high spatial resolution within the region of interest.

3. The ultrasound system according to claim 2, wherein the image processor produces a wide view of the volumetric region based on the relatively low spatial resolution ultrasound image data and a detail view of the region of interest based on the relatively high spatial resolution ultrasound image data.

4. The ultrasound system according to claim 3, further comprising an image display coupled to the image processor, arranged to display both the wide view of the volumetric region and the detail view of the region of interest.

5. The ultrasound system according to claim 4, wherein the image display is operated to display both the wide view and the detail view in spatial registration.

6. The ultrasound system according to claim 1, further comprising a user interface coupled to the ROI identifier and responsive to a manual selection of the ROI within the volumetric region.

7. The ultrasound system according to claim 6 wherein the user interface is a touch screen associated with an image display.

8. The ultrasound system according to claim 3, wherein the detail view of the region of interest is updated in real time.

9. The ultrasound system according to claim 4, wherein the image display is further arranged to display a current position of the probe within the volumetric region.

10. The ultrasound system according to claim 1, wherein the transducer frequency controller is adapted to simultaneously set, the operation frequencies of the CMUT transducers to the second frequency for the ultrasound beams steered within the ROI and to the first frequency for the ultrasound beams steered outside the region of interest, the second frequency being higher than the first frequency.

11. The ultrasound system according to claim 1, wherein the array is a one-dimensional array.

12. The ultrasound system according to claim 1, wherein the array is a two-dimensional array.

13. A method of variable frequency ultrasound imaging of a volumetric region comprising a region of interest, wherein the method comprises:

steering ultrasound beams in a variable frequency range over the volumetric region;

controlling steering the ultrasound beams and providing ultrasound image data of the volumetric region, wherein the controlling comprises setting a frequency of the steered ultrasound beams to a first frequency;

processing the ultrasound image data in order to produce an ultrasound image;

generating identification data indicating the region of interest in the ultrasound image data within the volumetric region;

computing a distance from a probe to the region of interest;

reducing the distance by translating the probe with respect to the region of interest while the ultrasound beams are steered within the region of interest, the reduction being based on the identification data; and automatically changing, based on the identification data, the frequency of the ultrasound beams steered within the region of interest from the first frequency to a second frequency, the second frequency being higher than the first frequency.

14. The method according to claim 13 further comprising providing the ultrasound image data having a relatively low spatial resolution within the volumetric region and relatively high spatial resolution within the region of interest.

15. The method according to claim 14 comprising producing a wide view of the volumetric region based on the relatively low spatial resolution ultrasound image data and a detail view of the region of interest based on the relatively high spatial resolution ultrasound image data.

* * * * *